United States Patent
Nakakuki

(10) Patent No.: US 7,855,739 B2
(45) Date of Patent: Dec. 21, 2010

(54) IMAGE SIGNAL PROCESSING APPARATUS

(75) Inventor: Toshio Nakakuki, Mizuho (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1097 days.

(21) Appl. No.: 11/018,485

(22) Filed: Dec. 22, 2004

(65) Prior Publication Data

US 2005/0174438 A1 Aug. 11, 2005

(30) Foreign Application Priority Data

Dec. 22, 2003 (JP) .............................. 2003-425812

(51) Int. Cl.
- *H04N 5/208* (2006.01)
- *H04N 11/20* (2006.01)
- *H04N 5/228* (2006.01)

(52) U.S. Cl. .................. 348/252; 348/441; 348/458

(58) Field of Classification Search ................ 348/242, 348/252, 254, 272, 441, 458, 241, 250, 256, 348/671, 674–676; 382/260–264

See application file for complete search history.

(56) References Cited

U.S. PATENT DOCUMENTS

| 4,802,110 | A | * | 1/1989 | Richards et al. | ............. 708/308 |
| 4,805,129 | A | * | 2/1989 | David | ......................... 708/300 |
| 5,280,353 | A | * | 1/1994 | Baldwin | ...................... 348/674 |
| 6,040,860 | A | * | 3/2000 | Tamura et al. | .............. 348/252 |
| 6,281,873 | B1 | * | 8/2001 | Oakley | ........................ 345/418 |
| 6,381,279 | B1 | * | 4/2002 | Taubman | ............... 375/240.18 |
| 6,501,508 | B1 | * | 12/2002 | Song et al. | .................. 348/441 |
| 6,515,699 | B2 | * | 2/2003 | Tanji et al. | .................... 348/254 |
| 6,895,256 | B2 | * | 5/2005 | Harma et al. | ............. 455/556.1 |
| 7,106,478 | B2 | * | 9/2006 | Takano | ....................... 358/3.26 |
| 7,116,372 | B2 | * | 10/2006 | Kondo et al. | ................. 348/448 |
| 2003/0081858 | A1 | * | 5/2003 | Rathnam et al. | ............ 382/298 |

FOREIGN PATENT DOCUMENTS

JP      A 9-98437      4/1997

* cited by examiner

*Primary Examiner*—David L Ometz
*Assistant Examiner*—Carramah J Quiett
(74) *Attorney, Agent, or Firm*—Oliff & Berridge, PLC

(57) ABSTRACT

In an image signal processing apparatus, line memories conventionally provided at a latter stage of the apparatus in order to convert a VGA image signal into a CIF image signal are eliminated. Image data of the VGA held in a unit of one line in plural line memories 60 provided in a digital signal processing circuit are weighted and added in a VLPF 62. A factor setting part 76 of the VLPF 62 changes weighting factors according to a positional relation between a position of a generation object line of the CIF and a line of the VGA. The weighting factors are determined so that a characteristic of trapping ½ of a vertical sampling frequency fv is also obtained. The VLPF 62 uses the weighting factors to trap fv/2, and changes the position of the vertical sampling point to a position of each line of the CIF image.

8 Claims, 6 Drawing Sheets

(related art)

IMAGE SIGNAL PROCESSING APPARATUS

FIELD OF THE INVENTION

The present invention relates to an image signal processing apparatus for converting an original image into an image different in the number of scanning lines.

BACKGROUND OF THE INVENTION

A solid image pickup device mounted in an imaging apparatus such as a digital camera has reached a high level of resolution, and for example, even if printing in a large size is performed, a high picture quality can be obtained. On the other hand, the resolution of a display device such as a liquid crystal display device has not been improved as compared with the solid image pickup device. Besides, from the beginning, since the display mounted on the imaging apparatus is relatively small and is provided for use in confirmation of a shot image, very high resolution is not required.

Also in cellular phones with camera function, there appears one equipped with a high resolution solid image pickup device. However, in the case where an image photographed by that is transmitted by wireless, an image with low resolution is transmitted from the restriction of transmission capacity. Besides, in a digital camera or the like, an image with high resolution is recorded in a still image shooting mode, while an image with low resolution is recorded in a motion picture shooting mode from the restriction of recording capacity.

Further, with respect to an image format, there are standards such as VGA (Video Graphics Array) and CIF (Common Intermediate Format). Specifically, the VGA size is 640 dots horizontally by 480 dots vertically, and the CIF size is 352 dots horizontally by 288 dots vertically. Besides, the respective standards include QVGA size, QCIF size and the like. For example, the CIF is often adopted in the motion picture photographing.

As described above, although the solid image pickup device has reached a high level of resolution, an image signal outputted from the device is not always used as it is, and is often converted into another format and is used. For example, in the case where an image taken in the VGA size is converted into the CIF size, it is necessary to perform scaling of ⅗ with reference to the vertical size.

Conventionally, in the scaling performed in a digital camera or the like, luminance data Y and color-difference data U and V generated by a digital signal processing circuit on the basis of an image signal taken by a solid image pickup device are once stored in a frame memory or the like. The scaling is performed by carrying out an interpolation operation or the like on the image data stored in this memory. For example, image data of two adjacent lines before conversion are linearly interpolated, so that image data of a line positioned therebetween in an image after conversion is generated.

However, when one screen is once stored in the memory and the scaling processing is performed, a delay time due to the image storage into the memory occurs. Thus, there is a problem that a time lag occurs and operationality is lowered in a situation in which a real-time property is required, such as a format conversion at the time of display on a preview screen or a zooming processing during motion picture photographing.

Then, the real-time property of the image format conversion processing is improved by a structure shown in FIG. 1. FIG. 1 is a block diagram of a conventional imaging apparatus in which a photographed VGA image is converted into a CIF image and is outputted. This imaging apparatus includes a CCD image sensor 2 and an image signal processing circuit for processing an image signal $Y0(t)$ outputted by the CCD image sensor 2. The image signal processing circuit includes an analog signal processing circuit 4, an ADC (analog-to-digital converter) 6, a digital signal processing circuit 8, and a format conversion circuit 10.

The CCD image sensor 2 includes color filters of Bayer arrangement in which color components are changed at a period of two pixels in each of the line direction and the column direction, and outputs the VGA image signal $Y0(t)$.

Image data $D(n)$ at each pixel of the VGA image is inputted to the digital signal processing circuit 8. The digital signal processing circuit 8 includes a VLPF 20 and a HLPF 22 in order to remove noise which causes moire. The VLPF 20 is a filter for trapping a frequency component of ½ of a vertical sampling frequency, and the HLPF 22 is a filter for trapping a frequency component of ½ of a horizontal sampling frequency. Line memories 24 (24-1 to 24-5) for holding five lines of image data used in the VLPF 20 are connected to the input of the VLPF 20. As described later, the VLPF 20 outputs three kinds of image data $I_Y$, $I_{C1}$ and $I_{C2}$. The image data $I_Y$, $I_{C1}$ and $I_{C2}$ are inputted to a signal processing part 26 through the HLPF 22. The signal processing part 26 performs signal processing such as color separation, gamma correction and contour correction. The RGB data outputted from the signal processing part 26 are inputted to a YUV generation part 28. The YUV generation part 28 generates luminance data Y and color-difference data U and V on the basis of the RGB data.

The data Y, U and V outputted from the digital signal processing circuit 8 have respectively VGA resolution, and the format conversion circuit 10 converts these into luminance data Y', and color-difference data U' and V' of CIF resolution. In the case where a line of a CIF image is defined between two adjacent lines of a VGA image, the format conversion circuit 10 linearly interpolates image data of two lines of the VGA image, and generates image data of the CIF image corresponding to the line. The format conversion circuit 10 includes line memories 30 (30-1, 30-2) for holding the two adjacent lines of the luminance data Y of the VGA image. An interpolation processing part 36-1 interpolates the two lines, and generates the luminance signal Y' of the CIF image. Besides, the format conversion circuit 10 includes two line memories 34 (34-1, 34-2) and an interpolation processing part 36-2 in order to perform a similar interpolation processing on the two kinds of color-difference data U and V. The line memories 34 and the interpolation processing part 36-2 are shared between the processings of the two kinds of color-difference data.

FIG. 2 is a circuit diagram showing a circuit structure of the VLPF 20. Image data D (hereinafter, image data of a kth line is referred to as $D(k)$) of five lines (jth line to (j+4)th line), which are continuous in the VGA image and are respectively held in the five line memories 24, are inputted in parallel to the VLPF 20. The VLPF 20 generates three kinds of image data $I_Y$, $I_{C1}$ and $I_{C2}$ corresponding to a center line position of the five lines. The image data held in the line memories 24 are exchanged in synchronization with the output of the CCD image sensor 2, and in response to that, the image data $I_Y$, $I_{C1}$ and $I_{C2}$ are obtained in sequence for each line. The VLPF 20 weights the respective data of the jth to (j+4)th lines. Here, a weighting factor for each of them is determined so that the filter characteristic of trapping the frequency component of ½ of the vertical sampling frequency is obtained as described above, and for example, the weighting factors can be respectively made 1, 6, 10, 6 and 1 for the jth to (j+4)th lines. In order to perform the weighting, the image data D of the (j+1)th to (j+3)th lines are respectively inputted to multipliers 40-1 to

40-3 whose multiplication factors are set to 6, 10 and 6. An adder 42-1 adds the weighted image data of five lines and generates the image data $I_Y$. An adder 42-2 adds the weighted image data of the (j+1)th line and the (j+3)th line and generates the image data $I_{C1}$. An adder 42-3 adds the weighted image data of the jth, (j+2)th and (j+4)th lines and generates the image data $I_{C2}$. That is, with respect to the (j+2)th line of the VGA image, three kinds of image data are generated:

$$I_Y(j+2)=D(j)+6D(j+1)+10D(j+2)+6D(j+3)+D(j+4)$$

$$I_{C1}(j+2)=6D(j+1)+6D(j+3)$$

$$I_{C2}(j+2)=D(j)+10D(j+2)+D(j+4)$$

As described above, the format conversion to change the vertical resolution, such as the conversion from VGA to CIF, is conventionally performed by the interpolation processing in the vertical direction. In order to perform this interpolation processing in real time, the line memories for holding the two adjacent lines of image data generated in the formation before conversion are provided. Since this interpolation processing is performed on each line of the original image after plural kinds of image data, such as the luminance data Y and the color-difference data U and V, are obtained, in order to process them simultaneously and in parallel, plural pairs of line memories are required like the line memories 30 and 34 as set forth in the above example.

Here, in the case where an imaging apparatus is mounted in a small equipment such as a cellular phone, further miniaturization of an image processing apparatus is required. Thus, there has been a problem to omit the line memories 30 and 34 used for the format conversion, and to reduce constituent parts, to reduce the chip area of an integrated circuit, and to reduce the cost.

Incidentally, JP-A-9-98437 discloses an imaging apparatus using a solid image pickup device including a mosaic filter. The publication relates to a technique to generate image data in which moire is suppressed, and discloses a related technique to generate image data of each line of a VGA image on the basis of image data of plural lines outputted from the solid image pickup device.

SUMMARY OF THE INVENTION

The present invention has been made to solve the problem, and has an object to provide an image signal processing apparatus which does not require a line memory used for only conversion of vertical resolution of an image signal outputted from an imaging apparatus.

An image signal processing apparatus of the invention is inputted with original image data in which plural color components periodically appear in each column of sampling points arranged in a matrix at a repetition period of a specified number of lines, generates target image data different from the original image data in vertical sampling period, and includes a data holding part for holding plural lines of the inputted original image data which are in a line range of a specified width and have a specified positional relation to each other, a target image data generation part for generating the target image data at a target line of a position corresponding to the line range of the original image by weighting the original image data of the plural lines held in the data holding part for each line and adding them to each other, and a factor setting part for setting, according to the target line, weighting factors for the respective lines used in the weighting and addition performed in the target image data generation part, wherein the factor setting part determines the weighting factors on the basis of a trap characteristic of attenuating, in the target image data, a frequency component corresponding to a vertical sampling frequency of the original image and the repetition period of the color components, and a mutual positional relation between a vertical sampling point corresponding to each line of the original image data held in the data holding part and a vertical sampling point corresponding to the target line.

BRIEF DESCRIPTION OF THE DRAWINGS

FIG. 5 is a schematic view showing a mutual relation of sampling positions of a VGA image and a CIF image in the vertical direction.

DESCRIPTION OF THE PREFERRED EMBODIMENTS

Figure 1:
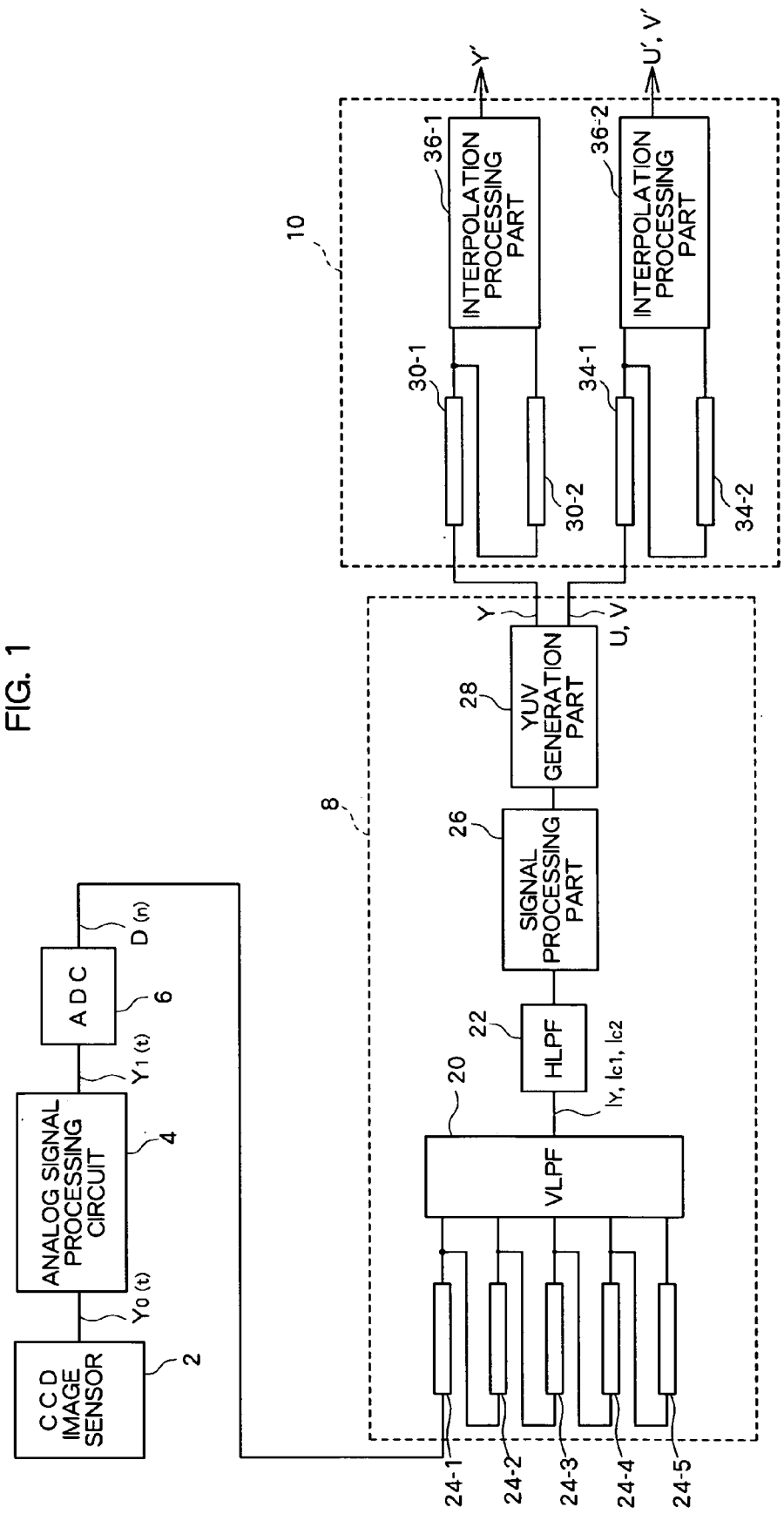
FIG. 1 is a block structural diagram of a conventional imaging apparatus.
Figure 2:
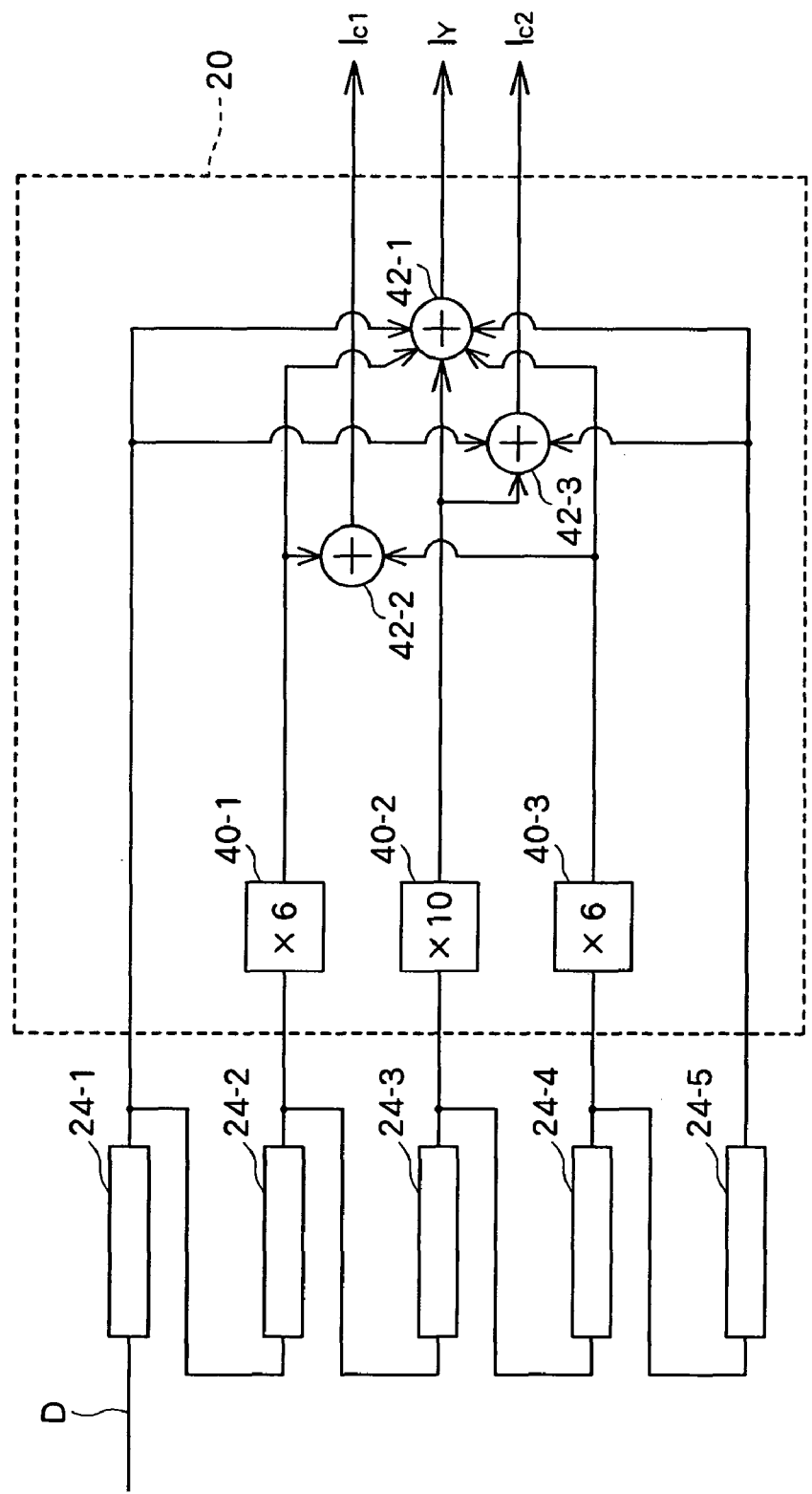
FIG. 2 is a circuit diagram showing a circuit structure of a conventional VLPF.

First, the basic aspect of an image signal processing apparatus as a preferred embodiment of the present invention will be outlined.

This image signal processing apparatus is inputted with original image data in which plural color components periodically appear in each column of sampling points arranged in a matrix at a repetition period of a specified number of lines, and generates target image data different from the original image data in vertical sampling period. The image signal processing apparatus includes a data holding part for holding plural lines of the inputted original image data which are in a line range of a specified width and in a specified positional relation, a target image data generation part for generating the target image data at a target line of a position corresponding to the line range of the original image by weighting the original image data of the plural lines held in the data holding part and adding them to each other, and a factor setting part for setting weighting factors for the respective lines in the weighting and addition performed in the target image data generation part according to the target line. The factor setting part determines the weighting factors on the basis of a trap characteristic of attenuating, in the target image data, a frequency component corresponding to a vertical sampling frequency of the original image and the repetition period of the color components, and a mutual positional relation between a vertical sampling point corresponding to each line of the original image data held in the data holding part and a vertical sampling point corresponding to the target line.

Like an image signal obtained from a solid image pickup device including mosaic color filters, with respect to an original image signal in which plural color components are periodically obtained at a repetition frequency of a specified number of lines in the column direction (vertical direction), a trap filter is provided in order to suppress moire noise, and a processing to attenuate a frequency component corresponding to vertical sampling frequency and color component repetition period of the original image is performed. This processing can be performed by holding image data of plural lines of the original image and by weighting and adding them. Conventionally, for the purpose of holding the data, plural line memories are provided as a data holding part. In the present image signal processing apparatus, this data holding part is used for both a function of a trap filter and a conversion function of a sampling point position in the vertical direction from the original image to the target image. The position of a line of the target image with respect to the line arrangement of the original image is not necessarily constant, but can vary according to each line of the target image. In order to deal with this, the image signal processing apparatus includes the factor setting part, and the target image data generation part is constructed so that the weighting factors in the weighting and adding processing can be changed. The factor setting part changes the weighting factors to each line of the original image held in the data holding part according to the positional relation between the line as a calculation object of the target image and lines of the original image held in the data holding part. The target image data generation part uses the changed weighting factors to weight and add the original image data held in the data holding part, and generates the target image data. The factor setting part determines the weighting factors so as to satisfy not only a condition of change of a vertical sampling point from the original image to the target image but also a condition of realizing the function as the trap filter. Besides, in the image signal processing apparatus, the original image data used for the change of the vertical sampling point from the original image to the target image is data before the processing such as color separation is performed, and is data of each line for each vertical sampling point of the original image data. As stated above, with respect to each vertical sampling point of the original image, the conversion of the vertical sampling point is performed before plural kinds of image data are generated, so that the circuit structure is simplified and the processing load is reduced.

For example, in the case where the repetition period of the color components has n lines, the factor setting part can be constructed to give the trap characteristic of attenuating the frequency component corresponding to 1/n of the vertical sampling frequency of the original image to the target image data generation part. As an example, in the case wherein is 2, the trap characteristic of attenuating the frequency component of around ½ of the vertical sampling frequency is set. In general, the trap characteristic of attenuating the frequency component of around 1/n, 2/n, . . . (n−1)/n of the vertical sampling frequency can be set.

The data holding part includes, for example, plural line memories each being capable of holding the original image data of one line.

Besides, for example, the data holding part holds the original image data of the respective lines in the line range, and the target image data generation part calculates the luminance data by weighting and adding the original data of the respective lines in the line range, and the color component data by weighting and adding, on the basis of the weighting factors, respective lines at every repetition period at which the structure (kind, arrangement) of the color components becomes the same in the original image data held in the data holding part.

In this structure, one set of original data including plural lines are stored in the data holding part, and when the weighting factors for the respective lines are set, plural kinds of image data are generated for the respective lines of the target image at the same time by using them.

Up to this point, the basic aspect of the image signal processing apparatus of the preferred embodiment of the invention has been outlined. Next, specific contents of a mode for carrying out the present invention (hereinafter referred to as an embodiment) will be described in detail with reference to the drawings.

Figure 3:
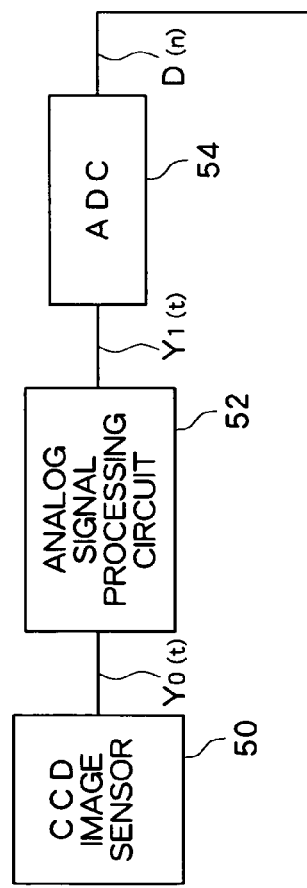
FIG. 3 is a rough block diagram of an imaging apparatus according to an embodiment of the invention.
Figure 3:
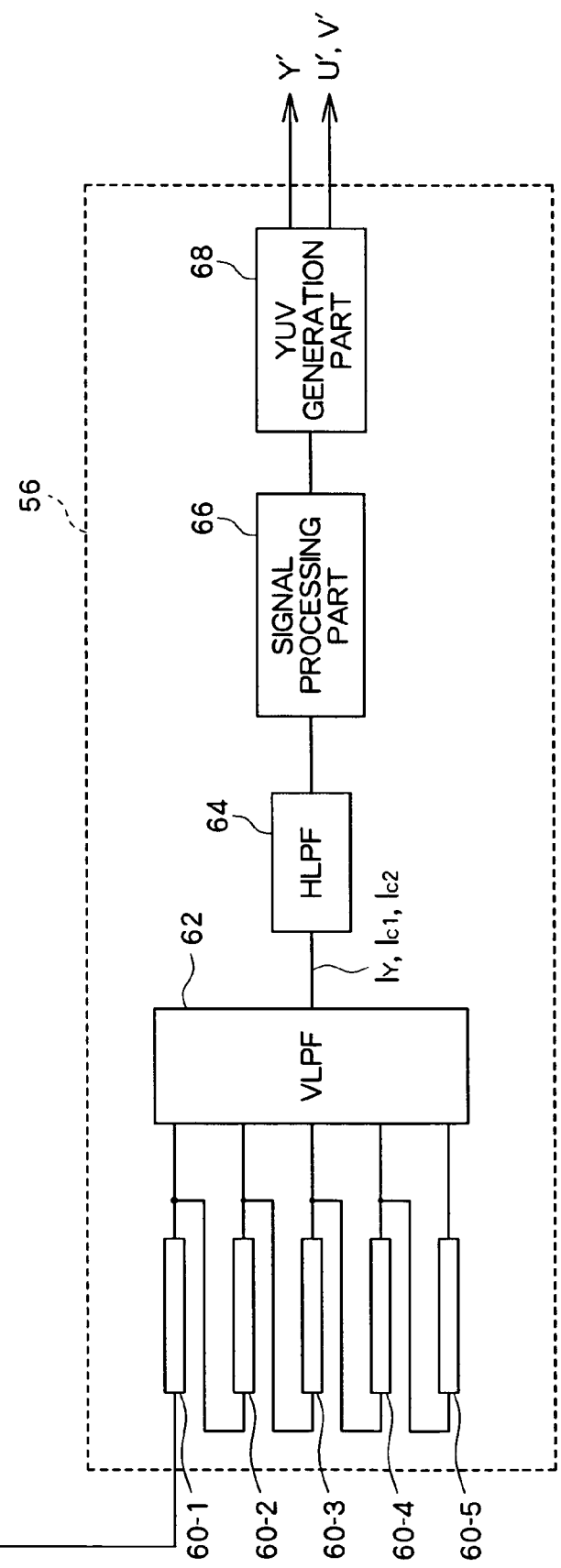

FIG. 3 is a schematic block diagram of an imaging apparatus according to the embodiment of the invention. This imaging apparatus can take an image in VGA size, convert the image into CIF size, and output it. This imaging apparatus includes a CCD image sensor 50, and an image signal processing circuit for processing an image signal $Y0(t)$ outputted by the CCD image sensor 50. The image signal processing circuit includes an analog signal processing circuit 52, an ADC (analog-to-digital converter) 54, and a digital signal processing circuit 56.

The CCD image sensor 50 includes, for example, color filters of Bayer arrangement, is driven by a drive pulse from a not-shown image sensor control circuit, and outputs the VGA image signal $Y0(t)$.

The analog signal processing circuit 52 captures the image signal outputted from the CCD image sensor 50, and performs various analog signal processings such as sample holding and gain adjustment. The ADC 54 captures an image signal $Y1(t)$ which has been subjected to the analog signal processing, converts it into a digital signal for every pixel, and outputs it as image data $D(n)$ to the digital signal processing circuit 56. Hereinafter, image data D of a kth line is denoted by $D(k)$. The arrangement of RGB components in the image data D is, for example, RGRG . . . from the line head at an odd line, and GBGB . . . from the line head at an even line.

The digital signal processing circuit 56 includes line memories 60, a VLPF 62, a HLPF 64, a signal processing part 66, and a YUV generation part 68. The plural memories 60 are provided, and this apparatus includes, for example, five line memories 60-1 to 60-5. Each of the line memories 60 has a capacity of storing one line of VGA image data D outputted from the ADC 54, and they are connected in series to each other and sequentially store the image data D in a unit of one line. That is, the line memories 60-1 to 60-5 store the image data D of five continuous lines (jth to (j+4)th lines) in the VGA image. The image data $D(j)$ to $D(j+4)$ held in the line memories 60-1 to 60-5 are inputted in parallel to the VLPF 62.

Figure 4:
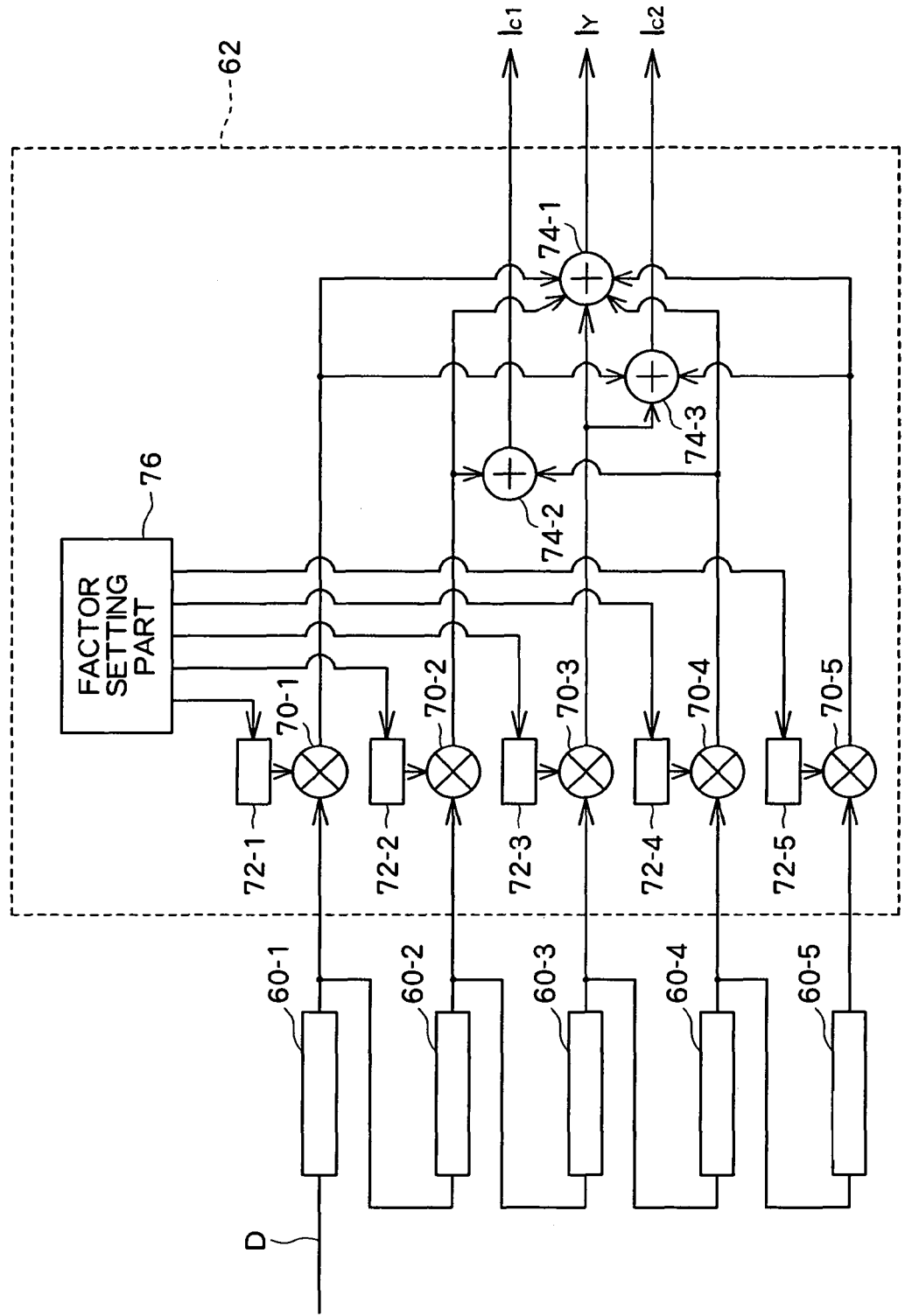
FIG. 4 is a circuit diagram showing a rough circuit structure of a VLPF according to the embodiment.

FIG. 4 is a circuit diagram showing a rough circuit structure of the VLPF 62. As described later, the VLPF 62 is a filter to trap a specified frequency component of a vertical sampling frequency, and has also a format conversion function from VGA to CIF. Multipliers 70-1 to 70-5 are disposed at respective input lines of the VLPF 62 provided to correspond to the respective line memories 60. Registers 72-1 to 72-5 are provided to correspond to the respective multipliers 70. Each of the registers 72 stores a multiplication factor am used in the multiplier 70, and the multiplier 70-$m$ (m=1 to 5) reads the stored value $\alpha m$ of the corresponding register 72-$m$, and sequentially multiplies the inputted image data $D(j+m-1)$ of the (j+m−1)th line by $\alpha m$. Three kinds of addition processings are performed on the output values of the five multipliers 70 by using adders 74-1 to 74-3. The adder 74-1 adds the image data of five lines weighted by am and generates image data $I_Y$. The adder 74-2 adds the weighted image data of the (j+1)th line and the (j+3)th line and generates image data $I_{C1}$. The adder 74-3 adds the weighted image data of the jth line, the (j+2)th line and the (j+4)th line and generates image data $I_{C2}$. That is, three kinds of image data are generated:

$$I_Y = \alpha 1 \cdot D(j) + \alpha 2 \cdot D(j+1) + \alpha 3 \cdot D(j+2) + \alpha 4 \cdot D(j+3) + \alpha 5 \cdot D(j+4)$$

$$I_{C1} = \alpha 2 \cdot D(j+1) + \alpha 4 \cdot D(j+3)$$

$$I_{C2} = \alpha 1 \cdot D(j) + \alpha 3 \cdot D(j+2) + \alpha 5 \cdot D(j+4)$$

This apparatus includes a factor setting part 76, and the contents of each of the registers 72 are rewritten by this factor setting part 76. In this apparatus, R and G, or G and B are alternately arranged in each column of the CCD image sensor 50. That is, the arrangement period of pixels in the vertical direction is a period of two pixels. Due to this, moire noise of a frequency component of ½ of the vertical sampling frequency $f_v$ in the VGA image is apt to occur. Then, a first condition that the VLPF 62 has a trap characteristic of attenuating a signal component in a band of around $f_v/2$ is imposed on a set of factors am which are set simultaneously. Besides, a second condition that a sampling position in the vertical direction is changed from VGA to CIF by weighting and addition in the VLPF 62 is imposed.

Figure 5:
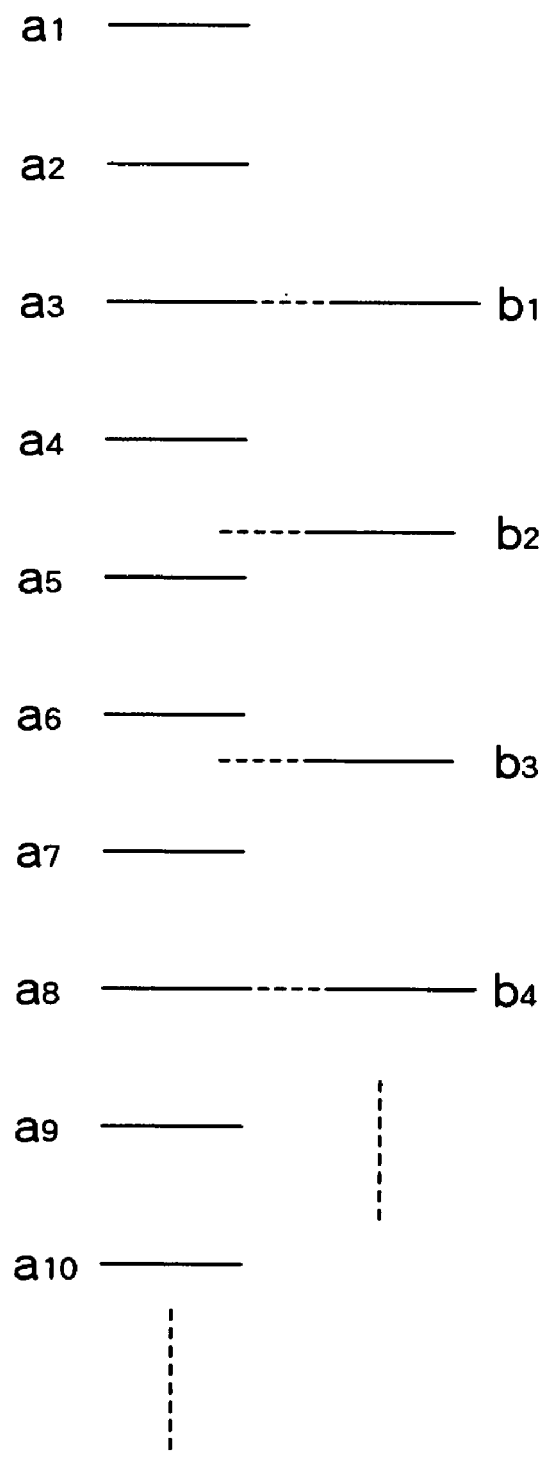

FIG. 5 is a schematic view showing a mutual relation of sampling positions in the vertical direction of each of a VGA image and a CIF image. A horizontal line segment close to a symbol "$a_i$" denotes a sampling position of an $a_i$th line in the VGA image, and a horizontal line segment close to a symbol "$b_i$" denotes a sampling position of a $b_i$th line in the CIF image. Here, the $b_1$th line of the CIF is placed at the same position as the $a_3$th line of the VGA, and after that, the line positions of both are coincident with each other at a period of three lines in the CIF and a period of five lines in the VGA. The $b_2$th line of the CIF is placed at a position where the interval between the $a_4$th line and the $a_5$th line of the VGA is internally divided at a ratio of 2:1, and the $b_3$th line of the CIF is placed at a position where the interval between the $a_6$th line and the $a_7$th line of the VGA is internally divided at a ratio of 1:2. These three kinds are repeated in the positional relation of the vertical sampling points of the CIF to the vertical sampling points of the VGA, and accordingly, three kinds of sets of αm become necessary. Values of αm constituting each set are previously calculated and are stored in the factor setting part 76. The factor setting part 76 can grasp the image data D corresponding to the first line of the VGA on the basis of a vertical synchronization signal VD generated by the image sensor control circuit, and can grasp the line number of the image data D inputted to the line memory 60-1 by counting a horizontal synchronization signal HD. The factor setting part 76 specifies a line of the CIF for which data is calculated according to the line range of the VGA held in the line memories 60-1 to 60-5. The factor setting part 76 judges which of the three kinds of positional relations the line has, selects the set of αm corresponding to the kind from the previously stored ones, and sets them in the respective registers 72.

Figure 6:
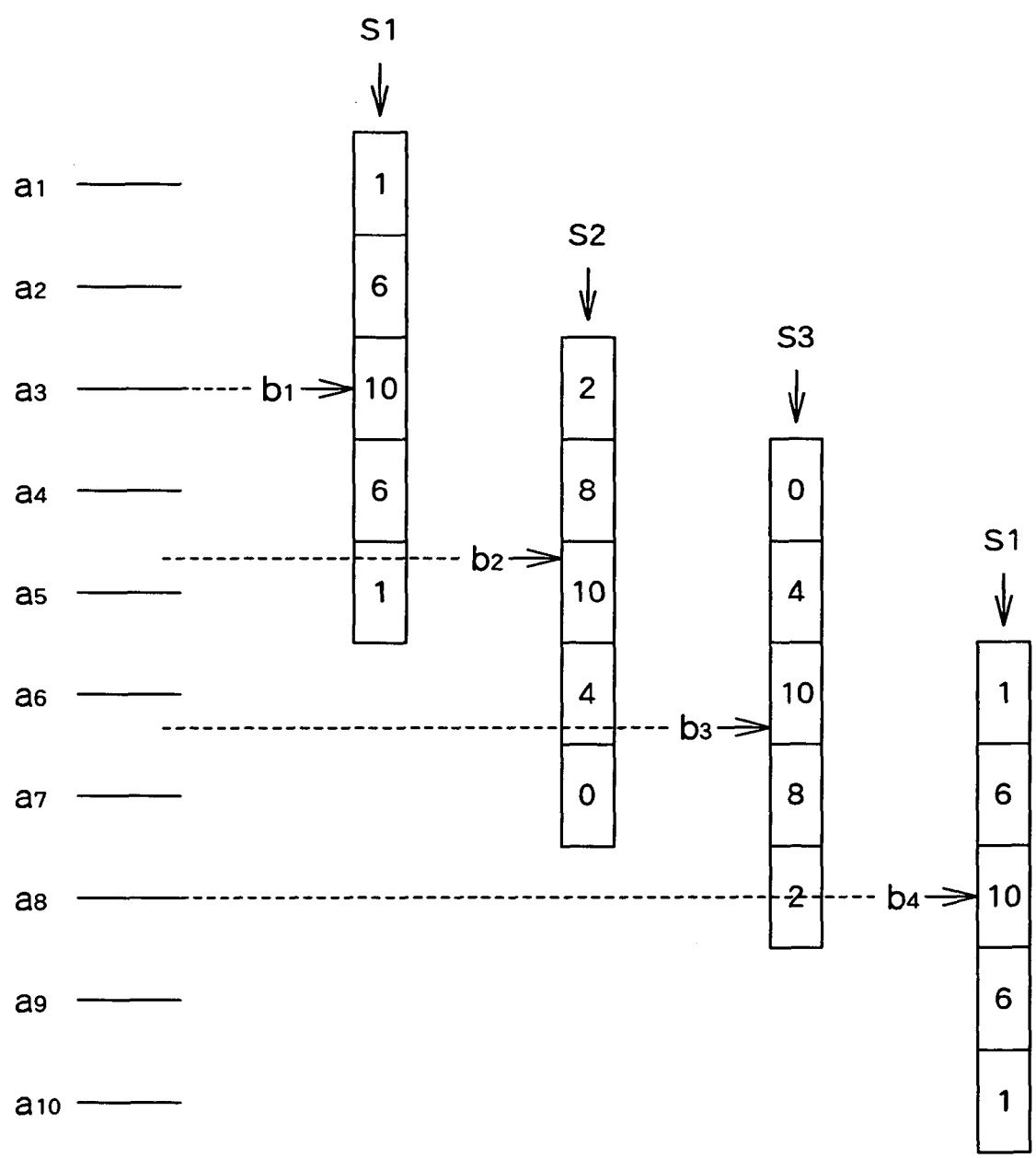
FIG. 6 is a schematic view showing an example of sets of am corresponding to three kinds of line positions of CIF with respect to the line arrangement of VGA.

FIG. 6 is a schematic view showing an example of the sets of αm corresponding to the three kinds of line positions of the CIF. The set S1 of αm corresponding to the case where a position (for example, the $b_1$th line) of a generation object line of the CIF is coincident with a line position (for example, the $a_3$th line) of the VGA can be made α1=1, α2=6, α3=10, α4=6, and α5=1. The set S1 is set in the registers 72 in synchronization with the timing when the image data D of the coincident line in the VGA is held at the center of the line range held in the line memories 60, that is, in the line memory 60-3.

Besides, for example, the set S2 of αm corresponding to the case where the position of the generation object line of the CIF is, for example, the $b_2$th line can be made α1=2, α2=8, α3=10, α4=4, and α5=0. This set S2 is set in the registers 72 in synchronization with the timing when the image data D of a line (for example, the $a_5$th line) of the VGA close to the generation object line (for example, the $b_2$th line) of the CIF is held at the center of the line range held in the line memories 60.

Besides, for example, the set S3 of αm corresponding to the case where the position of the generation object line of the CIF is, for example, the $b_3$th line can be made α1=0, α2=4, α3=10, α4=8, and α5=2. This set S3 is set in the registers 72 in synchronization with the timing when the image data D of a line (for example, the $a_6$th line) of the VGA close to the generation object line (for example, the $b_3$th line) of the CIF is held at the center of the line range held in the line memories 60.

Incidentally, in each of the sets S1 to S3, since the sum of the factors of the odd lines and the sum of the factors of the even lines balance with each other, a component of a frequency fv/2 can be trapped.

In this way, for example, at the timing when the $a_1$ to $a_5$ lines of the VGA are stored in the line memories 60, the VLPF 62 uses the set S1 of the factors to weight and add the image data D of the five lines, generates three kinds of image data $I_Y$, $I_{C1}$ and $I_{C2}$ corresponding to the $b_1$th line of the CIF and outputs them. Besides, for example, at the timing when the $a_3$th to the $a_7$th lines of the VGA are stored in the line memories 60, the VLPF 62 uses the set S2 of the factors to weight and add the image data D of the five lines, generates three kinds of image data $I_Y$, $I_{C1}$ and $I_{C2}$ corresponding to the $b_2$th line of the CIF and outputs them. Besides, for example, at the timing when the $a_4$th to the $a_8$th lines of the VGA are stored in the line memories 60, the VLPF 62 uses the set S3 of the factors to weight and add the image data D of the five lines, generates three kinds of image data $I_Y$, $I_{C1}$ and $I_{C2}$ corresponding to the $b_3$th line of the CIF and output them. Hereinafter, in the same way, the image data of each line of the CIF is calculated.

Incidentally, for example, the output of the VLPF 62 at the timing when the $a_2$th to $a_6$th lines of the VGA or the $a_5$th to $a_9$th lines are stored in the line memories 60 is not used as the image data of the CIF. Thus, the output of the VLPF 62 in that case can be discarded at a latter stage. Besides, for example, the factor setting part 76 sets 0 as the weighting factors in the respective registers 72 of the VLPF 62, and all outputs from the VLPF 62 may be kept 0.

Returning to FIG. 3, the description will be given to a structure subsequent to the VLPF 62. The image data $I_Y$, $I_{C1}$ and $I_{C2}$ at the vertical sampling point of the CIF generated in the VLPF 62 are inputted to the HLPF 64. A period of arrangement of pixels in relation to the horizontal direction of the CCD image sensor 50 is a period of two pixels similarly to the vertical direction. Then, the HLPF 64 attenuates a signal component in a band of around a frequency $f_H/2$ of ½ of a horizontal sampling frequency $f_H$, and suppresses the moire noise.

The image data $I_Y$, $I_{C1}$ and $I_{C2}$ outputted from the HLPF 64 are inputted to the signal processing part 66. The signal processing part 66 performs signal processings such as color separation, gamma correction and contour correction. RGB data outputted from the signal processing part 66 are inputted to the YUV generation part 68. The YUV generation part 68 generates luminance data Y' of the CIF image, and color-difference data U' and V', and outputs them from the digital signal processing circuit 56.

In the HLPF 64 or the signal processing part 66, conversion of sampling points from the VGA to the CIF in relation to the horizontal direction is performed. At that time, when 640 pixels of the VGA in the horizontal direction is scaled by ⅗, the number of pixels obtained becomes larger than 352 pixels in the horizontal direction of the CIF. Thus, a processing of trimming the surplus area in the horizontal direction can be performed.

Incidentally, as described above, the format conversion is performed against the background of the present state that an imaging apparatus can give high resolution as compared with a display system or a transmission system. That is, the format conversion is often performed in the direction of reducing the resolution. In that case, the number of sampling points is down-converted by performing the format conversion. According to this invention, as described by using the imaging apparatus of the foregoing embodiment, since the format conversion is performed at the first stage of the digital signal, arithmetic processing at the latter stage has only to be performed on the down-converted small data. That is, the amount of calculation in the digital signal processing circuit 56 is reduced and the processing is expedited.

On the other hand, in the case where an imaging apparatus has resolution lower than a display device, the number of sampling points is up-converted. In addition, for example, in a digital zoom processing for expanding and displaying a partial area of an image taken by an imaging apparatus on a display device, the up-conversion is performed also when the number of sampling points in the partial area is increased. This apparatus can perform also such up-conversion appropriately.

For example, in the case where the up-conversion is performed to generate image data enlarged twice while the format conversion is performed from the VGA to the CIF, an additional vertical sampling point is provided at a position where the interval of respective lines of the CIF is internally divided at a ratio of 1:1. A description will be made with reference to FIG. 5 or 6. A $b_1$'th line is added between the $b_1$th line and the $b_2$th line, a $b_2$'th line is added between the $b_2$th line and the $b_3$th line, and b3' line is added between b3 line and b4 line. Incidentally, the $b_1$'th line is placed at a point where the interval between the $a_3$th line and the $a_4$th line of the VGA is internally divided at a ratio of 5:1, the $b_2$'th line is placed at a point where the interval between the $a_5$th line and the $a_6$th line of the VGA is internally divided at a ratio of 1:1, and the $b_3$'th line is placed at a point where the interval between the $a_7$th line and the $a_8$th line is internally divided at a ratio of 1:5. The factor setting part 76 previously stores, as a set S1' of αm corresponding to the $b_1$'th line, for example, α1=1, α2=7, α3=11, α4=5, and α5=0, and set the S1' in the registers 72 in synchronization with the timing when the image data D of the $a_4$th line as a line of the VGA close to the $b_1$'th line is held at the center of the line range held in the line memories 60. Besides, the factor setting part 76 previously stores, as a set S2' of αm corresponding to the $b_2$'th line, for example, α1=0, α2=3, α3=9, α4=9, and α5=3, and sets the S2' in the registers 72 in synchronization with the timing when the image data D of the $a_5$th line as one of lines of the VGA close to the $b_2$'th line is held at the center of the line range held in the line memories 60. Besides, the factor setting part 76 previously stores, as a set S3' of αm corresponding to the $b_3$'th line, for example, α1=0, α2=5, α3=11, α4=7 and α5=1, and sets the S3' in the registers 72 in synchronization with the timing when the image data D of the $a_7$th line as a line of the VGA close to the $b_3$'th line is held at the center of the line range held in the line memories 60. By this, the image data at the respective lines of $b_1$', $b_2$', $b_3$', ... are generated, and the CIF image data enlarged twice can be obtained.

Here, with respect to the up-conversion, although the description has been given of the example in which the number of sampling points of the CIF is doubled, configuration can be made in the same way also with respect to another magnification. That is, in the case where the number of sampling points is multiplied by a factor of r, (r−1) vertical sampling points are added in an interval of the respective lines $b_1$ of the CIF, and a set of αm is defined for each of the points. The sets of am are previously stored in the factor setting part 76, and are set in the registers 72 at the timing when the vertical sampling point of a line of the target expanded CIF image is positioned in the vicinity of the center of the line range of the VGA held in the line memories 60.

What is claimed is:

1. An image signal processing apparatus inputted with original image data in which plural color components periodically appear in each column of sampling points arranged in a matrix at a repetition period of n lines, and for generating target image data different from the original image data in a vertical sampling period, comprising:

a data holding part for holding plural lines of the inputted original image data, which are in a line range of a specified width and have a specified positional relation to each other, the original image data being image data that exists before color separation is performed;

a target image data generation part for generating the target image data at a target line of a position corresponding to the line range of the original image by weighting the original image data of the plural lines held in the data holding part for each line and adding the weighted image data of the plural lines; and a factor setting part for setting, according to the target line, weighting factors for the respective lines used in the weighting and addition performed in the target image data generation part, wherein the factor setting part determines the weighting factors on the basis of a trap characteristic of attenuating, in the target image data, a frequency component corresponding to 1/n of a vertical sampling frequency of the original image and the repetition period of the color components to perform format conversion before the color separation, and a mutual positional relation between a vertical sampling point corresponding to each line of the original image data held in the data holding part and a vertical sampling point corresponding to the target line.

2. The image signal processing apparatus according to claim 1, wherein the data holding part includes plural line memories, and at least one of the plural line memories holding the original image data of one line.

3. The image signal processing apparatus according to claim 1, wherein:

the data holding part holds the original image data of the respective lines in the line range; and the target image data generation part calculates luminance data by weighting and adding the original image data of the respective lines in the line range, and color component data by weighting and adding, on the basis of the weighting factors, respective lines at the repetition period at which a structure of the color components becomes the same in the original image data held in the data holding part.

4. The image signal processing apparatus according to claim 1, wherein:

n kinds of lines different in structure of the color components are arranged in a specified order in the repetition period; and the factor setting part determines the weighting factors on the basis of a requirement that with respect to each of n kinds of common structure line groups made of the original image data of the plural lines, which are respectively held in the data holding part and are equal to each other in the color component structure, a barycenter of the weight factors becomes a position corresponding to the vertical sampling point corresponding to the target line, and sum values of the weighting factors in the respective common structure line groups become equal to each other.

5. The image signal processing apparatus according to claim 1, wherein the factor setting part previously stores sets of the weighting factors, whose number corresponds to kinds of the positional relation between the vertical sampling point corresponding to each line of the original image data held in the data holding part and the vertical sampling point corresponding to the target line, judges the kind of the positional relation, and sets the set of the weighting factors corresponding to the kind into the target image data generation part.

6. The image signal processing apparatus according to claim 5, wherein the factor setting part stores L sets of the weighting factors in a case where a value L times as large as the vertical sampling period of the target image data becomes the least common multiple of the vertical sampling period of the original image data and the vertical sampling period of the target image data.

7. The image signal processing apparatus according to claim 5, wherein:
- the original image data is VGA image data;
- the target image data is CIF image data; and
- the factor setting part stores three sets of the weighting factors.

8. The image signal processing apparatus according to claim 1, further comprising:
- a signal processing part for performing color separation on the target image data.

* * * * *